United States Patent
Uluderya et al.

(10) Patent No.: US 9,185,006 B2
(45) Date of Patent: Nov. 10, 2015

(54) EXCHANGE OF SERVER HEALTH AND CLIENT INFORMATION THROUGH HEADERS FOR REQUEST MANAGEMENT

(71) Applicant: Microsoft Corporation, Redmond, WA (US)

(72) Inventors: Gokhan Uluderya, Redmond, WA (US); Tyler Furtwangler, Seattle, WA (US); Bijul Soni, Redmond, WA (US); Eric Fox, Seattle, WA (US); Sanjay Rama, Redmond, WA (US); Kfir Ami-ad, Redmond, WA (US); Roshane Silva, Seattle, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

(21) Appl. No.: 13/716,913

(22) Filed: Dec. 17, 2012

(65) Prior Publication Data

US 2014/0173092 A1    Jun. 19, 2014

(51) Int. Cl.
| | | |
|---|---|---|
| G06F 15/173 | (2006.01) | |
| G06F 15/16 | (2006.01) | |
| H04L 12/26 | (2006.01) | |
| H04L 29/08 | (2006.01) | |

(52) U.S. Cl.
CPC ............ H04L 43/00 (2013.01); H04L 67/1008 (2013.01); H04L 67/327 (2013.01)

(58) Field of Classification Search
CPC ............................ H04L 12/66; H04L 12/1417
USPC ......................................... 709/203, 223–224
See application file for complete search history.

(56) References Cited

U.S. PATENT DOCUMENTS

| | | | |
|---|---|---|---|
| 7,636,917 B2 | 12/2009 | Darling et al. | |
| 7,840,678 B2 | 11/2010 | Joshi | |
| 7,990,847 B1 | 8/2011 | Leroy et al. | |
| 8,028,090 B2 | 9/2011 | Richardson et al. | |
| 8,346,225 B2 * | 1/2013 | Raleigh | 455/414.1 |
| 2002/0002686 A1 | 1/2002 | Vange et al. | |
| 2002/0032727 A1 | 3/2002 | Dias et al. | |
| 2003/0236745 A1 * | 12/2003 | Hartsell et al. | 705/40 |
| 2004/0024861 A1 * | 2/2004 | Coughlin | 709/224 |
| 2004/0210663 A1 | 10/2004 | Phillips et al. | |
| 2005/0080890 A1 * | 4/2005 | Yang et al. | 709/223 |
| 2006/0165060 A1 * | 7/2006 | Dua | 370/352 |
| 2008/0028463 A1 * | 1/2008 | Dagon et al. | 726/22 |

(Continued)

OTHER PUBLICATIONS

"Request Management in SharePoint Server 2013 Preview, Part One: Feature Capability and Architecture Overview", Retrieved at <<http://www.harbar.net/articles/sp2013rm1.aspx>>, Jul. 27, 2012, pp. 7.

(Continued)

*Primary Examiner* — Minh-Chau Nguyen
(74) *Attorney, Agent, or Firm* — Tom Wong; Jim Ross; Micky Minhas (57) ABSTRACT

Server health and client information are exchanged through headers for request management. Headers in standardized or proprietary protocol communication between servers and a request management module and/or clients and the request management module may be used to exchange server health and client information. The exchanged server health and/or client information may be employed in throttling, routing, and/or load balancing the incoming requests. Rules specified by the client through the header exchange may also be used for throttling, routing, and/or load balancing decisions.

18 Claims, 8 Drawing Sheets

(56) References Cited

U.S. PATENT DOCUMENTS

| | | | |
|---|---|---|---|
| 2009/0288169 A1* | 11/2009 | Petta et al. | 726/26 |
| 2011/0092153 A1* | 4/2011 | Patron et al. | 455/3.01 |
| 2011/0138053 A1 | 6/2011 | Khan et al. | |
| 2012/0030341 A1* | 2/2012 | Jensen et al. | 709/224 |
| 2012/0084419 A1 | 4/2012 | Kannan et al. | |
| 2013/0227078 A1* | 8/2013 | Wei et al. | 709/219 |
| 2014/0173091 A1* | 6/2014 | Lipstone et al. | 709/224 |

OTHER PUBLICATIONS

"Configuring Load Balancing", Retrieved at <<http://www.cisc.com/en/US/docs/app_ntwk_services/data_center_app_services/ace_appliances/vA1_7_/configuration/device_manager/guide/UG_lb.pdf>>, Retrieved Date: Sep. 17, 2012, pp. 104.

"Application Request Routing", Retrieved at <<http://www.iis.net/downloads/microsoft/application-request-routing>>, Retrieved Date: Sep. 17, 2012, pp. 3.

"International Search Report & Written Opinion for PCT Patent Application No. PCT/US2013/075655", Mailed Date: Apr. 17, 2014, Filed Date: Dec. 17, 2013, 15 Pages.

"In Introduction to HTTP Basics", Published on: May 13, 2012, Available at: http://web.archive.org/web/20120513121251/http://www3.ntu.edu.sg/home/ehchua/programming/webprogramming/HTTP_Basics.html.

\* cited by examiner

EXCHANGE OF SERVER HEALTH AND CLIENT INFORMATION THROUGH HEADERS FOR REQUEST MANAGEMENT

BACKGROUND

Modern data communication architectures involve commonly "server farms", a collective of servers that manage storage, processing, and exchange of data for a variety of purposes. Many services are increasingly provided as web applications, hosted applications that may be accessed by users through browsers or similar thin clients without burdening the users with local installations, updates, compatibility issues, etc. Thus, a server farm may include up to thousands of servers providing web applications for productivity, communications, data analysis, data storage, and comparable services. Client applications (thin or thick) interact with the hosted applications through "requests". For example, a word processing application provided as a web application may receive a request from a client application to open a document, find the document in a networked store, retrieve its contents, and render at the client application. Another example may be a "Save" request. When the user is done, they may select a "Save" control on the client application, which may send a save request to the web application resulting in updating of the stored document.

Because a number of servers may be involved with the web application, an incoming request needs to be directed to the proper server(s) such that the requested task can be completed. Request management is one of the management approaches that helps a server farm manage incoming requests by evaluating logic rules against the requests in order to determine which action to take, and which server or servers in the farm (if any) should handle the requests.

Traditional network load balancer devices are relatively expensive dedicated hardware devices for routing requests. Performing multi-layer routing, traditional routers may create a bottleneck as a network grows, causing the network traffic to slow down. Furthermore, conventional routing is also based on static rules failing to take into account dynamic changes in servers, requests, network loads.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to exchanging server health and client information through headers for request management. According to some embodiments, headers in standardized or proprietary protocol communication between servers and a management module such as a router or a throttler in a cloud-based service architecture may be used to exchange server health and client information. The exchanged server health and/or client information may be employed in throttling, routing, and/or load balancing the incoming requests. Request routing may also be implemented based on rules specified by the client through the header exchange.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, headers in Hypertext Transport Protocol (HTTP) or similar protocol based communications between serves and a management module (e.g. a router or a throttler) may be used to exchange server health and client information such that requests can be throttled/routed/load balanced based on server health information, client information, etc.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable physical media.

Throughout this specification, the term "platform" may be a combination of software and hardware components for exchanging headers in server communications to convey server health and client information as part of request management. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

Figure 1:
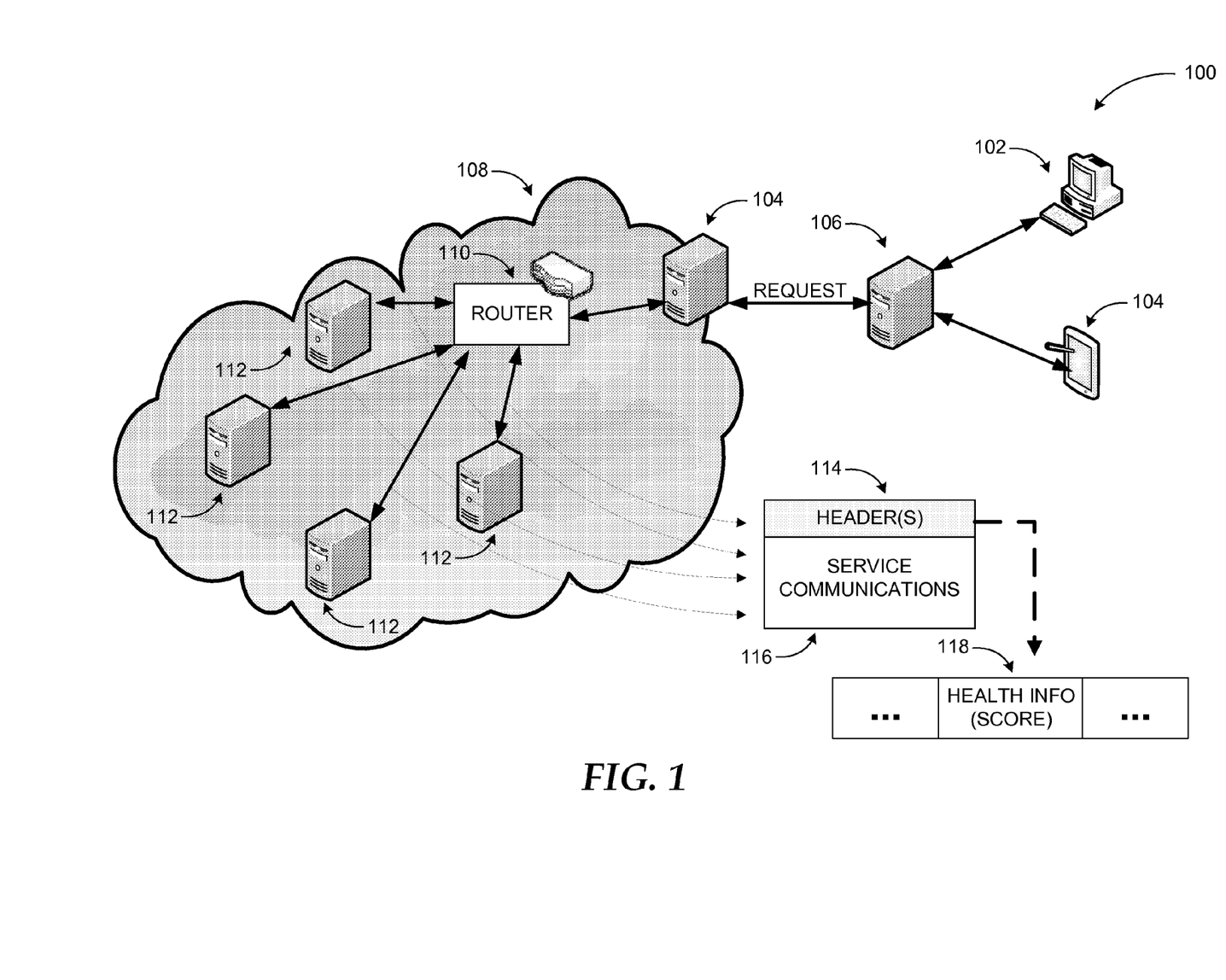
FIG. 1 illustrates an example network diagram, where server health information may be exchanged through service communication headers between a request management entity and servers according to some embodiments.

Referring to FIG. 1, diagram 100 illustrates an example network diagram, where server health information may be exchanged through service communication headers between a request management entity and servers according to some embodiments. The components and environments shown in diagram 100 are for illustration purposes. Embodiments may be implemented in various local, networked, cloud-based and similar computing environments employing a variety of computing devices and systems, hardware and software.

In an example environment illustrated in diagram 100, servers 112 may be part of a server farm or similar infrastructure (e.g. cloud 108) providing one or more hosted services to users accessing the services through client applications (e.g., browsers) executed on client devices 102 and 104, for example. A server 106 may receive requests from the client applications and forward those to a request management server 104 configured to route the requests to proper servers.

In an example scenario, a collaboration service such as Sharepoint® by Microsoft Corporation of Redmond, Wash. may be provided as the service. The collaboration service may enable storage, sharing, and editing of documents of various types, among other things. Thus, a user may access the collaboration service through a browser on their client device view a document, edit the document, and save it at its server location. These actions may be facilitated through requests submitted by the browser to the server 106 and routed by the request management server 104. Different servers in the cloud 108 may be responsible for different aspects of the service. For example, one server may be responsible for storage of certain types of documents, while another may be responsible for facilitating the editing functionality. In addition, multiple servers may be responsible for the same task to provide capacity, redundancy, etc. Request management server 104 may send a request through router 110 to a proper server based on that server's availability, health status, request type, and so on. In some embodiments, the routing (as well as throttling and/or load balancing functionality may be integrated into the router 110 instead of request management server 104).

In deciding which server to send a request to request management server may take into account, as discussed above, server health status. The server health status may be provided to the request management server 104 by the individual servers in form of a score or more detailed information (118) in headers 114 of service communications 116 as part of the regular communication exchange between the request management server 104 and the servers 112.

As part of the routine operations, the servers 112 and other components of the service may exchange service communications 116 periodically or on-demand. The service communications 116 may include headers 114. Examples of headers, depending on communication type may include HTTP headers, Sharepoint headers, etc. In an example system, each server may determine its health status (e.g., processor capacity, memory capacity, bandwidth, current load, etc.) and transmit the health status to the request management server 104.

The health information 118 or score may be customizable by an administrator. For example, the health status may be a single score, multiple scores (for groups or each of the health metrics), or more detailed information (health metric value). The information may be sent to the request management server 104 in the headers. The request management server 104 (or router 110) may take the health information into account in deciding whether to block or forward a request, which server to route the request to, and how to perform load balancing.

The header based exchange of health information and routing may be application intelligent and request routing (or throttling) prioritized based on an application the request is associated with. For example, requests associated with an application that has higher resource demand compared to another application may be deprioritized. Similarly, if a tenant uses a particular application (e.g., a productivity application), requests directed to servers associated with that tenant may be prioritized if they are associated with the tenant's preferred application.

In other embodiments, routing (and/or throttling) may be based on a hosted functionality. For example, different functionalities may be hosted on the same server, and requests for one or more of those functionalities may be prioritized. An example implementation may prioritize requests for accessing a team site over requests for downloading a large file, and so on. Similarly, functionality based routing may be performed among multiple servers (i.e., servers providing certain functionality may be selected over others providing other functionality).

The health score based, application intelligent, and functionality based routing features may be combined in various ways customizable by and administrator, for example. According to some embodiments, the request management server 104 and/or the router 110 may be implemented as software, hardware, or a combination of software and hardware.

Figure 2:
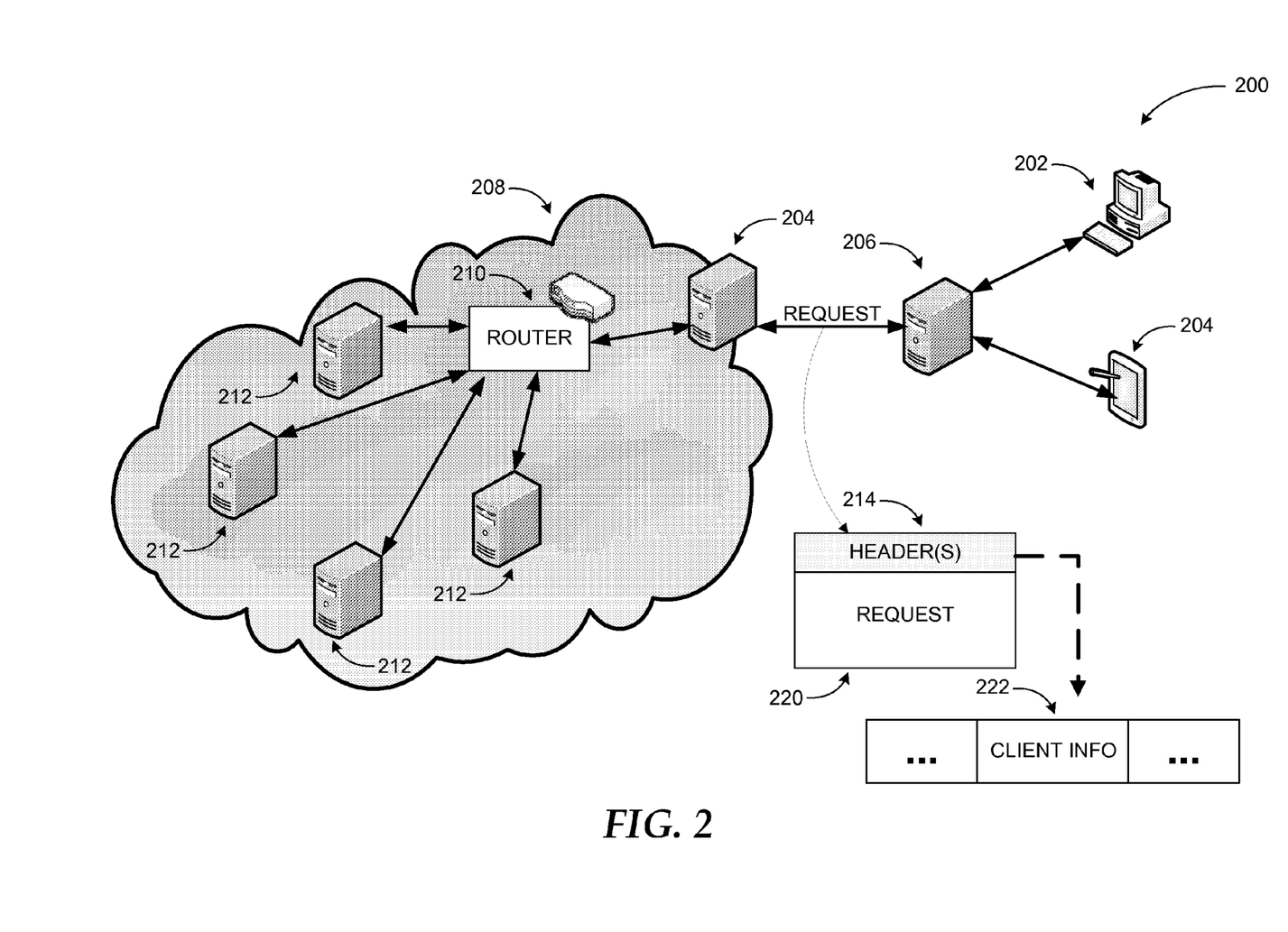
FIG. 2 illustrates an example network diagram, where client information may be exchanged through request headers between a request management entity and clients according to other embodiments.

FIG. 2 illustrates an example network diagram, where client information may be exchanged through request headers between a request management entity and clients according to other embodiments. Diagram 200 displays a cloud-based example infrastructure similar to that in FIG. 1. Servers 212 may perform various tasks associated with providing one or more hosted services and communicate with a request management server 204 through router 210 within cloud 208. Request management server 204 may receive requests 220 from a server 206, which in turn may receive multiple requests from client applications executed on computing devices 202 and 204, for example.

Each request may include a header 214, and each header 214 may include, in addition to other information, client information 222. The client information 222 may identify a client and/or a request. For example, the client may be identified as a real user or a bot. The request may be an "Open" request, a "Save" request, and any other task associated with the service provided by the servers 212.

The routing/throttling decisions may be made at the request management server 204 based on rules or a script. If the decision is made based on rules, client applications may be enabled to send information about themselves and/or the request such that the router can make the decision also based on the client information. For example, if the request is a bot request, it may be blocked or sent to a low health serve because it is likely to be repeated. On the other hand, a "Save" request from a word processor to a collaboration server may be high priority because the user may lose their document if the request is not processed correctly and timely.

According to some embodiments, the routing and throttling components may be configured for each application during its creation. The components may be executed prior to other service (e.g., collaboration) code. An example system may be scalable, where multiple routers manage groups of servers (e.g., hierarchical structure). In a multi-router environment, the routing/throttling rules (or script) may be provided to one and automatically disseminated to others. Similarly, client information discussed above may also be disseminated to all routers.

In some embodiments, the request management server may internally keep track of two sets of servers (1) a set of servers defined by the farm itself, which may not be removed or added manually, but changes to the farm may be reflected. The availability of each server may be modified per web application. (2) A custom set of machines defined by the administrator, which may be removed or added manually, and the availability of each may be modified per web application.

This differentiation of machine sets may allow for ease of use, with optional customization. The entry bar for enabling routing may be minimal if the administrator does not need to specify all servers. Additionally, the customization of additional servers may be a need for dedicated routing farm scenarios. The health status of each server in a routing targets list may be used to perform weighted load balancing.

In order to route the request to a final target, once determined, a new request may be created. The incoming request may be copied to this new request. This may include values such as: headers, cookies, request body, etc. The response from the server may be copied to the outgoing stream, which may also include values such as: headers, cookies, and response body, etc.

Figure 3:
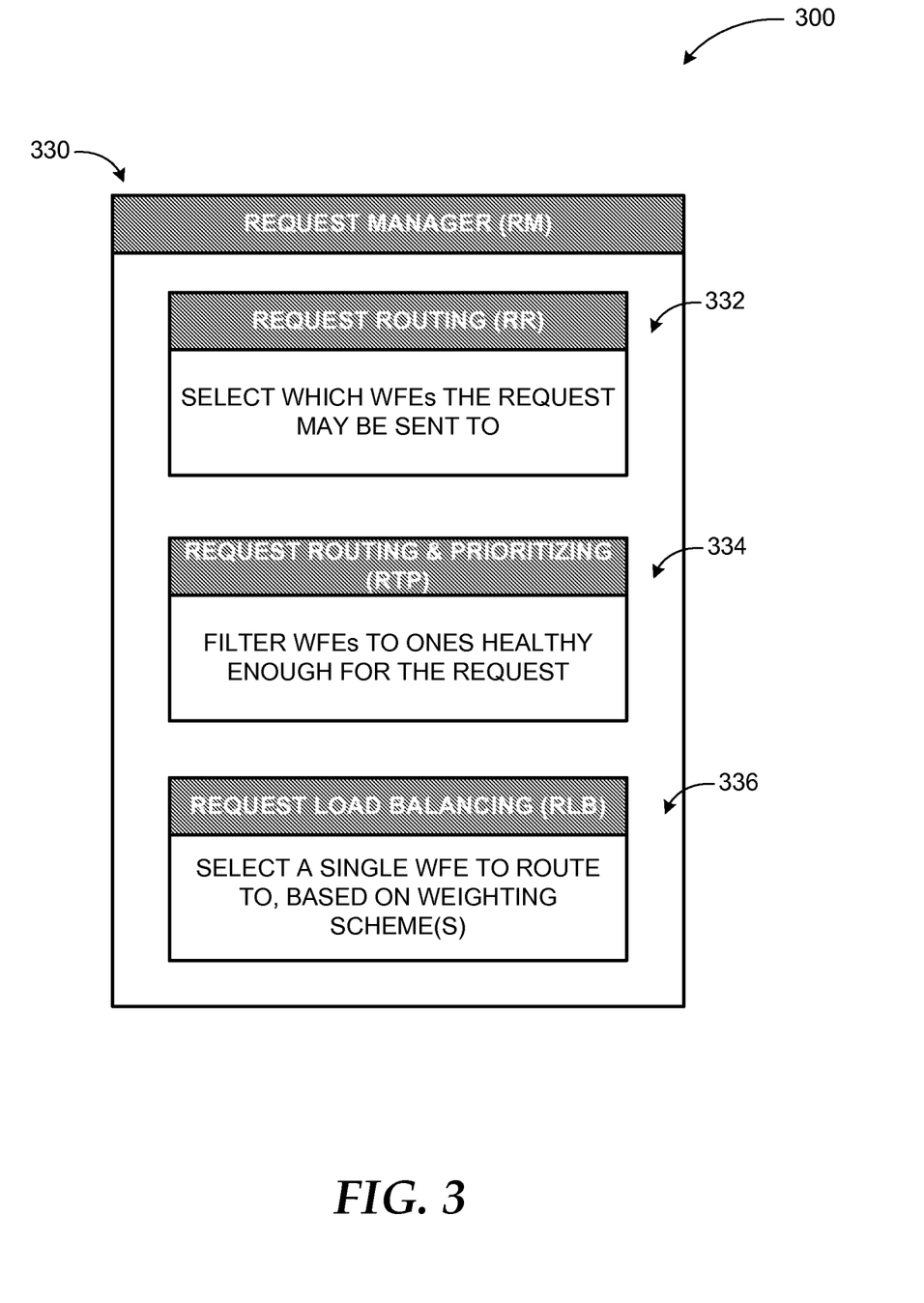
FIG. 3 illustrates a functional breakdown of a request manager according to embodiments.

FIG. 3 illustrates a functional breakdown of a request manager according to embodiments. Diagram 300 displays a Request Manager (RM) 330, whose task is to decide whether a request may be allowed into the service, and if so, to which WFE server the request may be sent. These two decisions may be made by the three major functional parts of RM 330, Request Routing (RR) 332, Request Throttling and Prioritizing (RTP) 334, and Request Load Balancing (RLB) 336. In some embodiments, RM 330 may perform request management on a per-web-application basis.

In an example configuration, RR 332 may select which WFE servers the request may be sent to. RTP 334 may filter WFEs to select those healthy enough to accept the request (e.g., processor capacity, memory capacity, etc.). RLB 336 may select a single WFE server to route the request based on weighting scheme(s). The load balancing feature may also take into account server health, in addition to other considerations such as network bandwidth, request type, and comparable ones.

Figure 4:
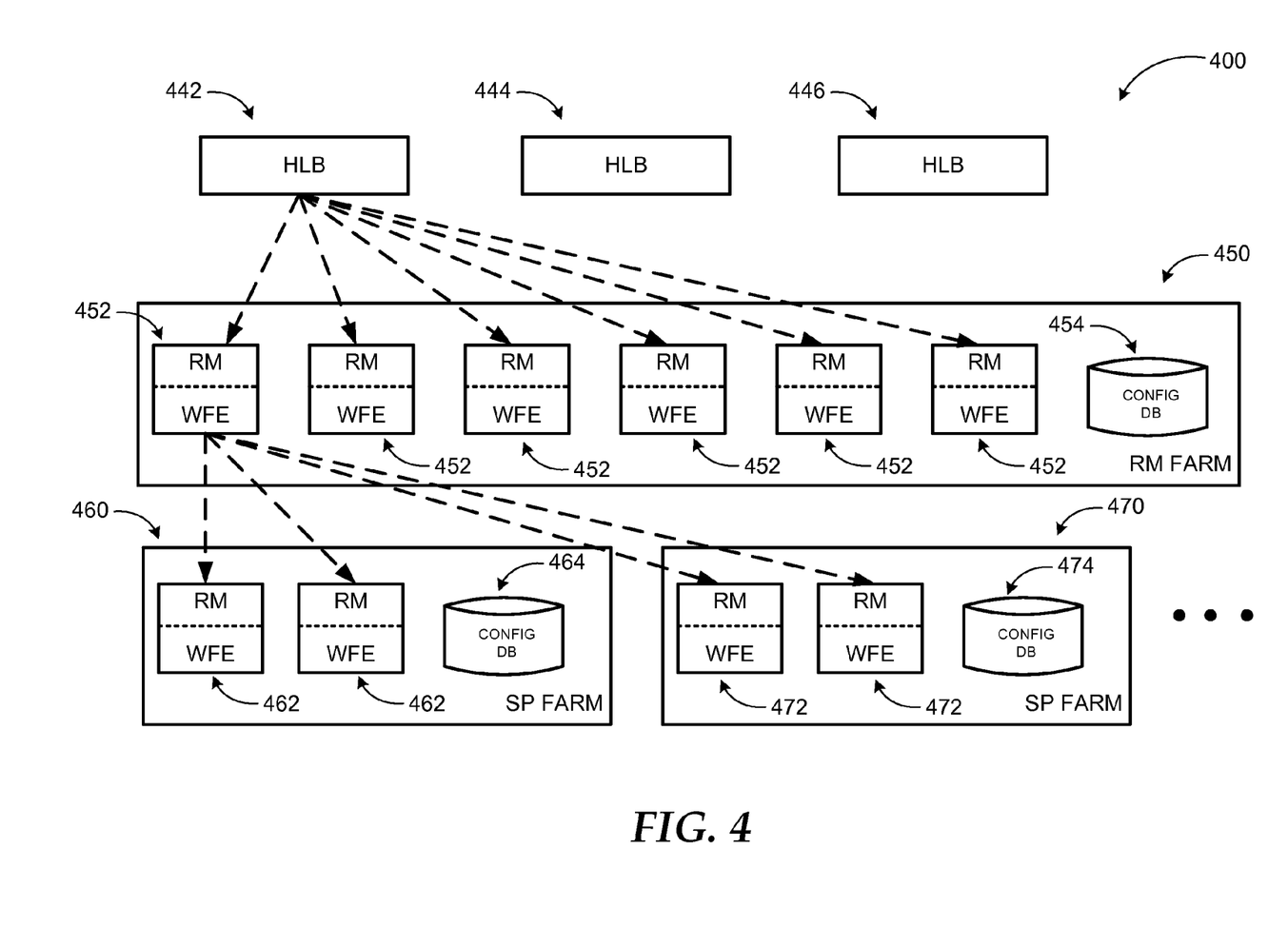
FIG. 4 illustrates conceptually an example server farm infrastructure in a dedicated mode deployment according to some embodiments.

FIG. 4 illustrates conceptually an example server farm infrastructure in a dedicated mode deployment according to some embodiments.

An RM according to embodiments may support two deployment modes: a dedicated mode and an integrated mode. Either mode may be used without restriction depending on an administrator decision regarding which mode is more suitable for a particular configuration. For example, both modes may be used simultaneously. A dedicated RM deployment may statically route to any WFE in a server farm, rather than a specific WFE in the server farm. An RM running on the WFE may then determine which of them within the farm may process a request based on farm-level information, such as WFE health.

The dedicated mode deployment, as shown in diagram 400, may include a set of WFEs 452 dedicated to performing RM duties only. This is a logical division of labor. The dedicated RM WFEs 452 may be placed in their own RM farm 450 that is located between the Hardware Load Balancers (HLBs) 442, 444, 446 and the regular SP farms 460, 470. The HLBs 442, 444, 446 may send all requests to the RM WFEs 452. RMs executed on these WFEs may decide to which service (SP) WFEs 462, 472 the requests may be sent, if any, and send them there without any more service processing. The SP WFEs 462, 472 may perform their regular tasks in processing the requests and then send responses back through the RM WFEs 452 to the clients.

The SP farms 460 and 460 may be configured to perform the same work as any other. Their difference from regular service farms may be that the RM WFEs have RM enabled, where, in a regular service farm, the WFEs may have RM disabled. Dedicated mode may be advantageous in larger-scale deployments when physical machines are readily available, since RM processing and service processing may not have to compete over resources as they would if they were executed on the same machine.

Figure 5:
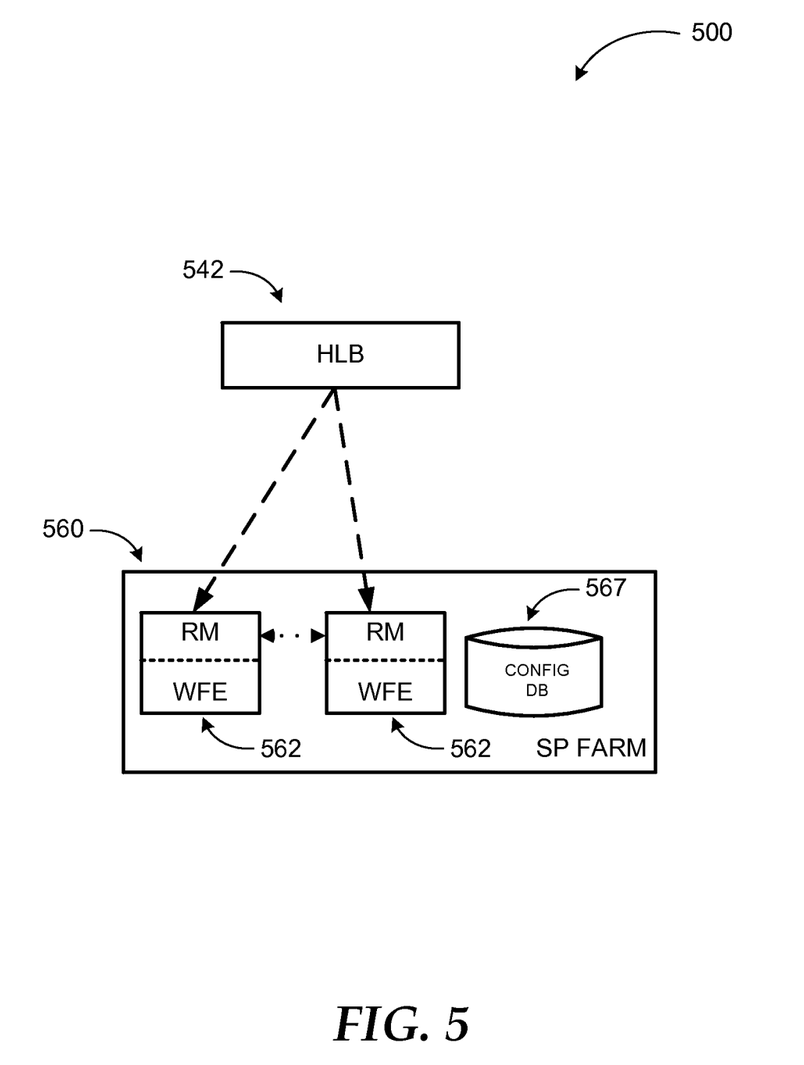
FIG. 5 illustrates conceptually an example server farm infrastructure in an integrated mode deployment according to other embodiments.

FIG. 5 illustrates conceptually an example server farm infrastructure in an integrated mode deployment according to other embodiments. Diagram 500 displays In an integrated mode deployment, as shown in diagram 500, all regular WFEs 562 within a service (SP) farm 560 may execute RM. Thus, HLBs (542) may send requests to all WFEs 562. When a WFE receives a request, RM may decide whether to allow it to be processed locally, route it to a different WFE, or deny it from being processed at all.

Integrated mode may be advantageous in smaller-scale deployments, when physical machines are not readily available. This mode may allow RM and the rest of service applications to be executed on all machines, rather than requiring machines dedicated to each. In some embodiments, RM may have several configurable parts, which may be grouped into two main categories: general settings and decision information. General settings may include parameters that encompass the feature as a whole, such as enabling/disabling RR and RTP. Decision information may include the information that is used during the routing and throttling processes, such as routing and throttling rules (or scripts).

The example scenarios and schemas in FIG. 1 through 5 are shown with specific components, communication protocols, data types, and configurations. Embodiments are not limited to systems according to these example configurations. Other protocols, configurations, headers, and so on may be employed in implementing exchange of server health and client information through headers for request management using the principles described herein.

Figure 6:
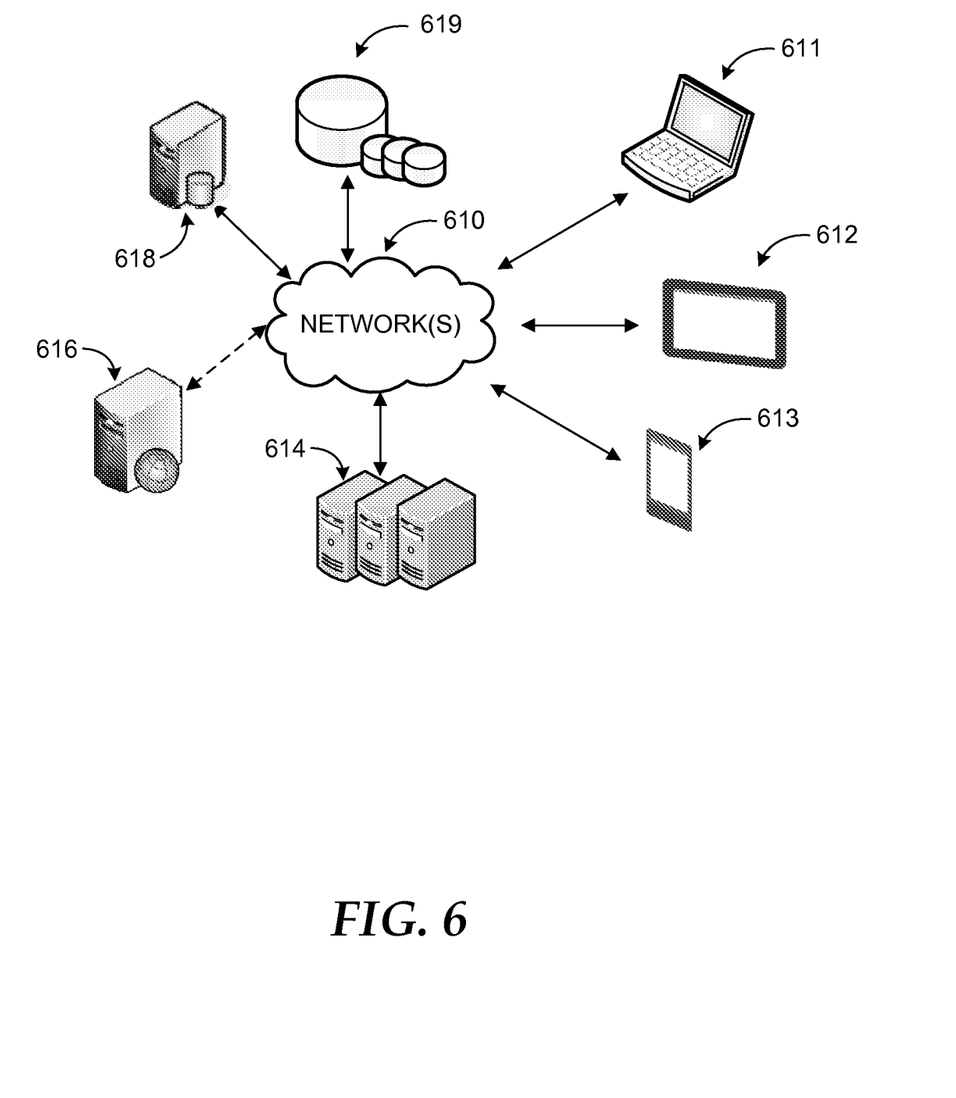
FIG. 6 is a networked environment, where a system according to embodiments may be implemented.

FIG. 6 is a networked environment, where a system according to embodiments may be implemented. Local and remote resources may be provided by one or more servers 614 or a single server (e.g. web server) 616 such as a hosted service. A request management application, such as a routing application, may be executed on a management server (e.g., server 614) directing requests from client application on individual computing devices such as a smart phone 613, a tablet device 612, or a laptop computer 611 ('client devices') to proper servers (e.g., database server 618) through network(s) 610.

As discussed above, server health and client information may be exchanged through headers for request management. Routing/throttling decisions may be made based on rules or a script at the router. If the decision is made based on rules, clients may be enabled to send information about themselves and/or the request such that the router can make the decision also based on the client information. Client devices 611-613 may enable access to applications executed on remote server (s) (e.g. one of servers 614) as discussed previously. The server(s) may retrieve or store relevant data from/to data store(s) 619 directly or through database server 618.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to exchange server health and client information through headers in server communications for request management. Furthermore, the networked environments discussed in FIG. 6 are for illustration purposes only. Embodiments are not limited to the example applications, modules, or processes.

Figure 7:
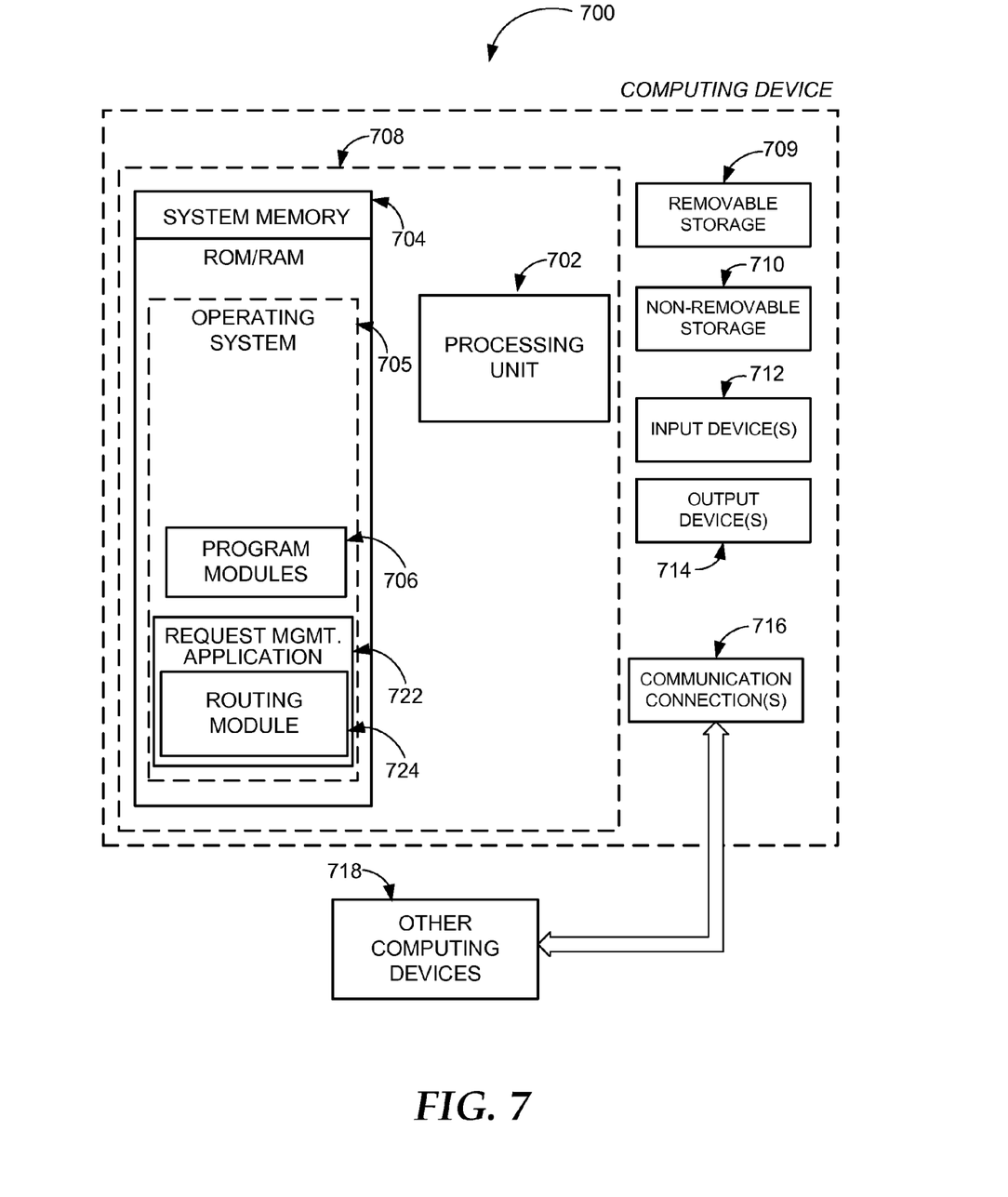
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® and WINDOWS PHONE® operating systems from MICROSOFT CORPORATION of Redmond, Wash. The system memory 704 may also include one or more software applications such as program modules 706, a request management application 722, and a routing module 724.

The request management application 722 may manage incoming requests including directing of requests to proper servers, maintenance of server status information, management of routing/throttling/load balancing rules and scripts according to embodiments. The routing module 724 may route incoming requests based on server health status and/or client information received through headers in communications with the servers and client applications. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. Computer readable storage media is a computer readable memory device. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wireless network in a distributed computing environment, a satellite link, a cellular link, and comparable mechanisms. Other devices 718 may include computer device(s) that execute communication applications, storage servers, and comparable devices. Communication connection(s) 716 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 8:
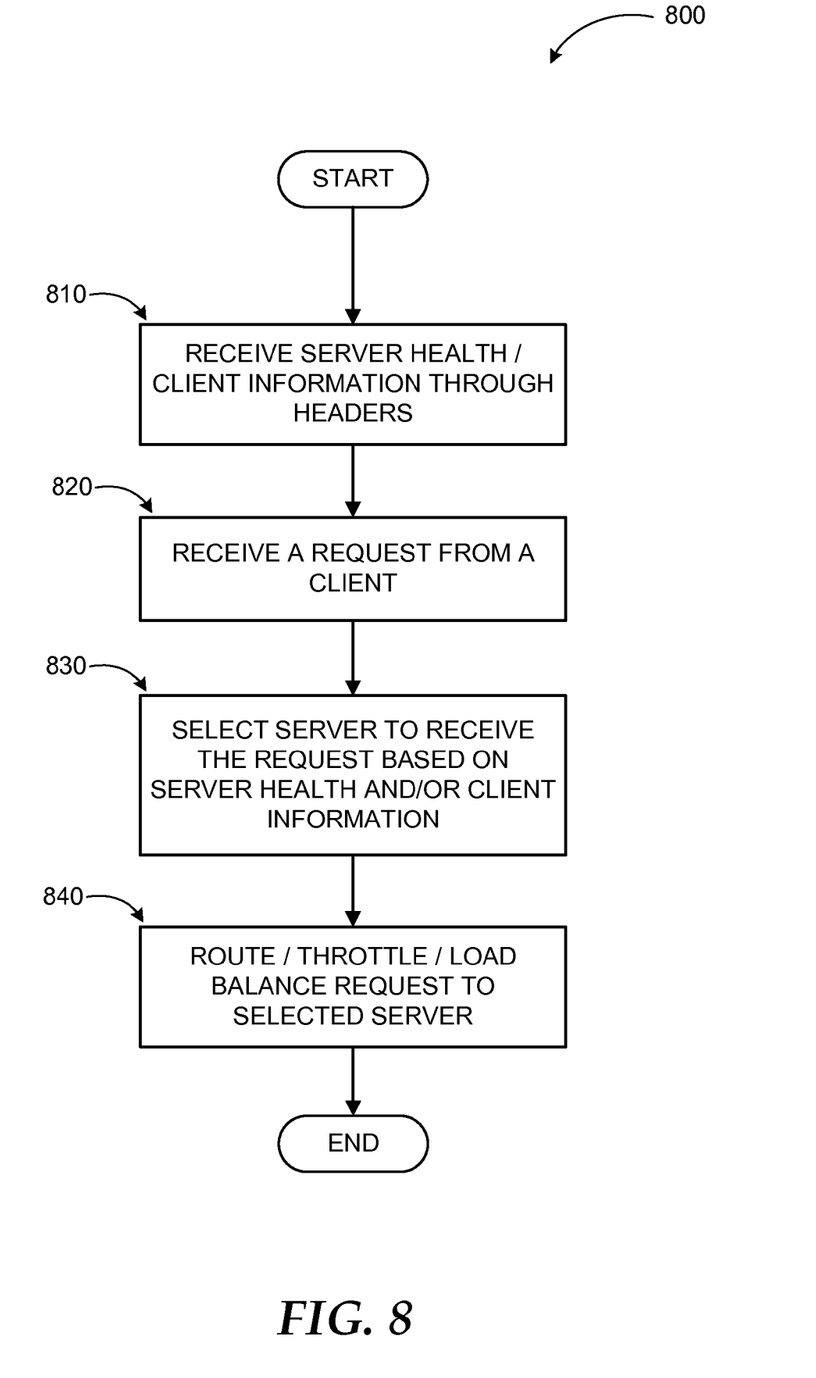
FIG. 8 illustrates a logic flow diagram for a process of exchanging server health and client information through headers for request management according to embodiments.

FIG. 8 illustrates a logic flow diagram for a process of exchanging server health and client information through headers for request management according to embodiments. Process 800 may be implemented by a request management application such as a router in a server farm management in some examples.

Process 800 may begin with operation 810, where server health information and/or client information (e.g., client type) may be received in headers of service communications from servers in a service infrastructure or in headers of request communication from one or more clients, respectively.

At operation 820, a request may be received from a client followed by operation 830, where a server to receive the request may be selected based on evaluating the received server health and/or client information. At operation 840, the request may be routed, throttled, or load balanced to the selected server.

Server health and/or client information based request management according to some embodiments may enable advanced routing and throttling behaviors. Examples of such behaviors may include routing requests to web servers with a good health score and preventing impact on lower health web servers; prioritizing important requests (e.g., end user traffic) by throttling other types of requests (e.g., crawlers); routing requests to web servers based upon HTTP elements such as host name or client IP Address; routing traffic to specific servers based on type (e.g., search, client applications, etc.); identifying and blocking harmful requests so the web servers never process them; routing heavy requests to web servers with more resources; and allowing for easier troubleshooting by routing to specific machines experiencing problems and/or from particular client computers.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 800 are for illustration purposes. Exchange of server health and client information through headers for request management according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for exchange of server health and client information through headers in request management, the method comprising:
receiving server health information in headers of service communication from one or more servers at one or more request managers in a service infrastructure;
receiving a request from a client at the one or more request managers, wherein the request includes client type information in a header of the request, the client type information including an indication of the client, wherein the one or more request managers are:
dedicated to perform request management tasks if a configuration of the service infrastructure is in a dedicated mode deployment, and
integrated to the one or more servers if the configuration of the service infrastructure is in an integrated mode deployment;
selecting a server at the one or more request managers from the one or more servers for the received request to be routed based on at least one of the received server health information and the client type information, wherein selecting the server based on the client type information includes, blocking or sending the request to a low health server, and sending the request to a server with high priority based on the client type information; and
performing one or more of the following actions at the one or more request managers:
routing the request to the selected server,
throttling the request, and
load balancing the request.

2. The method of claim 1, further comprising:
receiving the server health information in form of one a single health score, multiple health scores, and a health metric value.

3. The method of claim 2, wherein each of the multiple health scores is associated with a group of health metrics.

4. The method of claim 3, wherein the health metrics include one or more of a processor capacity, a memory capacity, an available bandwidth, and a current load.

5. The method of claim 1, wherein the service infrastructure is a scalable system comprising the one or more request managers receiving the server health information and the client type information.

6. The method acclaim 5, further comprising:
receiving at least one from a set of: a routing rule, a throttling rule, a load balancing rule, a routing script, and the client type information at one of the one or more request managers; and
disseminating the received one of the routing rule, the throttling rule, the load balancing rule, the routing script, and the client type information to remaining request managers.

7. The method of claim 1, further comprising:
enabling the server health information to be customized by an administrator.

8. The method of claim 1, further comprising:
making, at least one from a set of a routing decision, a throttling, decision, and a load balancing decision based on one of a rule and a script.

9. The method of claim 1, further comprising:
receiving the server health information through one of a periodic communication and an on-demand communication with the one or more servers.

10. A computing device for employing exchange of server health and client information through headers in request management, the computing device comprising:
a communication module configured to communicate with one or more servers in a service infrastructure and one or more clients;
a memory configured to store instructions; and
a processor coupled to the memory, the processor configured to execute a request management application in conjunction with the instructions stored in the memory, wherein the request management application is configured to:
- receive server health information in headers of one of a periodic service communication and an on-demand service communication from the one or more servers;
- receive a request from a client, wherein the request includes client type information;
- manage the request through one or more request managers that are dedicated to performing request management tasks in response to a configuration of the service infrastructure in a dedicated mode deployment;
- manage the request through the one or more request managers that are integrated to the one or more servers in response to a configuration of the service infrastructure in an integrated mode deployment;
- select a server from the one or more servers for the received request to be routed based on the received server health information and client type information, wherein the server is selected based on the client type information through one of:
  - blocking or sending the request to a low health server, and sending the request to a server with high priority based on the client type information; and
- one or more of route the request to the selected server, throttle the request, and load balance the request.

11. The computing device of claim 10, wherein the request management application is further configured to:
- receive the client type information in a header of communication providing the request from the client; and
- make at least one from a set of a routing decision, a throttling decision, and a load balancing decision based on the received client type information.

12. The computing device of claim 11, wherein the request management application is further configured to:
- employ one or more rules to make the decision, wherein the one or more rules are received from one of an administrator and the client, and disseminated to the one or more request managers in the service infrastructure.

13. The computing device of claim 10, wherein the processor is configured to perform one or more of routing the request to the selected server, throttling the request, and load balancing the request based on one or more of a server functionality, a type of application associated with the request, and a resource demand of the application associated with the request.

14. The computing device of claim 10, wherein the processor is configured to route the request to the selected server based on a functionality hosted by the selected server.

15. The computing device of claim 10, wherein the computing device is one of a request management server and a router.

16. A computer-readable memory device with instructions stored thereon for exchange of server health and client information through headers in request management, the instructions comprising:
- receiving server health information in form of one of a single health score, multiple health scores, and a health metric value from one or more servers in a service infrastructure in headers of service communication between the servers and one or more request managers;
- receiving a request from a client, wherein the request includes client type information identifying a client type in a header of the request,
- managing the request through the one or more request managers that are dedicated to performing request management tasks in response to a configuration of the service infrastructure in a dedicated mode deployment;
- managing, the request through the one or more request managers that are integrated to the servers in response to a configuration of the service infrastructure in an integrated mode deployment;
- making at least one from a set of a routing decision, a throttling decision, and a load balancing decision based on at least one of the received server health information and the client type information using one of a rule and a script, wherein making a routing decision based on the client type information includes blocking or sending the request to a low health server, and sending the request to a server with high priority; and
- one or more of routing the request to the selected server, throttling the request, and load balancing the request.

17. The computer-readable memory device of claim 16, wherein the instructions further comprise:
- routing the request to a server with a good health status and preventing impact on one or more servers with lower health status;
- prioritizing the request by throttling other types of requests; and
- routing the request to a selected servers based on one or more HTTP elements.

18. The computer-readable memory device of claim 16, wherein the instructions further comprise:
- routing the request to a server based on a type of the request and a type of the server;
- identifying and blocking harmful requests to prevent a server from processing the harmful request;
- routing heavy requests to servers with more resources; and
- enabling troubleshooting by at least one of routing to the request to a server experiencing problems and routing requests from selected clients to selected servers.

* * * * *